(12) United States Patent
Chauhan et al.

(10) Patent No.: US 10,958,420 B2
(45) Date of Patent: Mar. 23, 2021

(54) METHOD AND SYSTEM FOR BLOCKCHAIN-IMPLEMENTED PROJECT MANAGEMENT

(71) Applicant: MASTERCARD INTERNATIONAL INCORPORATED, Purchase, NY (US)

(72) Inventors: Ved Pratap Singh Chauhan, Uttar Pradesh (IN); Chandan Garg, Punjab (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 112 days.

(21) Appl. No.: 16/196,025

(22) Filed: Nov. 20, 2018

(65) Prior Publication Data

US 2020/0162237 A1    May 21, 2020

(51) Int. Cl.
*H04L 9/06* (2006.01)
*H04L 9/32* (2006.01)
*H04L 9/30* (2006.01)
*G06Q 10/10* (2012.01)

(52) U.S. Cl.
CPC ........ *H04L 9/0637* (2013.01); *G06Q 10/103* (2013.01); *H04L 9/30* (2013.01); *H04L 9/3213* (2013.01); *H04L 9/3247* (2013.01); *G06Q 2220/00* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,992,186 B1 * | 6/2018 | Drozd | H04L 63/0823 |
| 2003/0033167 A1 | 2/2003 | Arroyo et al. | |
| 2017/0078342 A1 | 3/2017 | Sherlock et al. | |
| 2017/0346804 A1 * | 11/2017 | Beecham | H04L 9/3236 |

* cited by examiner

*Primary Examiner* — Brandon S Hoffman
(74) *Attorney, Agent, or Firm* — Buchanan Ingersoll & Rooney PC

(57) ABSTRACT

A method for project management using a blockchain includes: receiving a project request including a project stream comprised of a plurality of role assignments and an ordering for the role assignments, wherein each role assignment indicates a corresponding public key; generating a first digital token; transmitting the first digital token to a first computing device associated with a public key corresponding to a first role assignment based on the ordering; receiving data from the first computing device including a data file, return token, and digital signature; validating the return token based on the first digital token; validating the digital signature using the public key corresponding to the first role assignment; transmitting the data file to a node in a blockchain network; and transmitting a second digital token to a second computing device associated with a public key corresponding to a second role assignment based on the ordering.

16 Claims, 5 Drawing Sheets ional charts, difficult to read or understand flow charts, and use of a confusing and/or archaic document management system. In many cases, the organization of a large project alone may require several dedicated employees and take up as much time as working on and completing the project itself.
METHOD AND SYSTEM FOR BLOCKCHAIN-IMPLEMENTED PROJECT MANAGEMENT

FIELD

The present disclosure relates to the implementation of project management using a blockchain, specifically the using of a blockchain to store data and private keys associated therewith to manage the roles for submitting data related to a project and enforcement of an established work order.

BACKGROUND

Every business has a need for project management at some level. For small businesses, project management may consist of three employees working together to ensure a project gets done timely and in the correct fashion, where management thereof may rely on simple communication. For large businesses, projects may be worked on by thousands of employees, and may rely on complicated organizational charts, difficult to read or understand flow charts, and use of a confusing and/or archaic document management system. In many cases, the organization of a large project alone may require several dedicated employees and take up as much time as working on and completing the project itself.

Thus, there is a need for better, more improved project management. Many solutions for better project management rely on creating better tools to assist in the creation and organization of a project, specifically creating more simplified and easier to understand organizational charts and flow charts. In many cases, a lot, if not all, of attention is paid to the overall organization of the project, such as to determine the most efficient ordering in terms of who will be producing what work product and in what order. However, little effort is made to control the implementation of such an ordering, often relying on simple communication and outdated document management tools to enable the employees to implement the desired project rules.

Thus, there is a need for technical solution to improve the implementation of a designed project management organization, specifically one that can enforce an ordering of work for a project and prevent individuals from doing their part when unauthorized or in an incorrect order. Such a system would be able to take advantage of improved organizational efforts, by ensuring that the better organization is implemented as planned, but without requiring specialized workshare, work-flow and tracking software that is typically customized for a particular business, such as disclosed in U.S. Published Patent Nos. 20030033167 and 20170078342 as examples.

SUMMARY

The present disclosure provides a description of systems and methods for project management using a blockchain. When a new project is organized, organization often includes the creation of one or more project streams, where a project stream identifies each of the individuals that will work on a particular aspect (referred to herein as a "stream") of a project as well as the ordering in which those individuals are to work. Digital tokens are generated for each of the individuals that are to work on a particular project stream, but are only distributed to individuals when it is their turn to perform the needed work. The individual performs their work as required, and provides it back to the processing server along with their digital token. The token is verified and their work is stored in the blockchain. Then, based on the role ordering identified in the project stream, the next digital token is distributed to the next individual for that stream in the project. The result is that only authorized users can contribute to a project and in the correct order, and where an individual will automatically be notified (e.g., via receipt of the digital token) that it is their turn to perform their actions as part of their role in the project. The use of a blockchain to store the data ensures that the data is not tampered with and provides an immutable, auditable history of the project contributions to ensure that the project is implemented as designed and to prevent any gaming of the system.

A method for project management using a blockchain includes: receiving, by a receiver of a processing server, a project request, wherein the project request includes at least a project stream comprised of a plurality of role assignments and an ordering for the plurality of role assignments, wherein each of the plurality of role assignments indicates a corresponding public key; generating, by a processing device of the processing server, a first digital token; transmitting, by a transmitter of the processing server, the first digital token to a first computing device associated with a public key corresponding to a first role assignment of the plurality of role assignments based on the ordering; receiving, by the receiver of the processing server, data from the first computing device, the data including at least a data file, a return token, and a digital signature; validating, by the processing device of the processing server, the return token based on the first digital token; validating, by the processing device of the processing server, the digital signature using the public key corresponding to the first role assignment; transmitting, by the transmitter of the processing server, at least the data file to a node in a blockchain network; and transmitting, by the transmitter of the processing server, a second digital token to a second computing device associated with a public key corresponding to a second role assignment of the plurality of role assignments based on the ordering.

A system for project management using a blockchain includes: a receiver of a processing server configured to receive a project request, wherein the project request includes at least a project stream comprised of a plurality of role assignments and an ordering for the plurality of role assignments, wherein each of the plurality of role assignments indicates a corresponding public key; a processing device of the processing server configured to generate a first digital token; and a transmitter of the processing server configured to transmit the first digital token to a first computing device associated with a public key corresponding to a first role assignment of the plurality of role assignments based on the ordering, wherein the receiver of the processing server is further configured to receive data from the first computing device, the data including at least a data file, a return token, and a digital signature, the processing device of the processing server is further configured to validate the return token based on the first digital token, and validate the digital signature using the public key corresponding to the first role assignment, and the transmitter of the processing server is further configured to transmit at least the data file to a node in a blockchain network, and transmit a second digital token to a second computing device associated with a public key corresponding to a second role assignment of the plurality of role assignments based on the ordering.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Project Management Using a Blockchain

Figure 1:
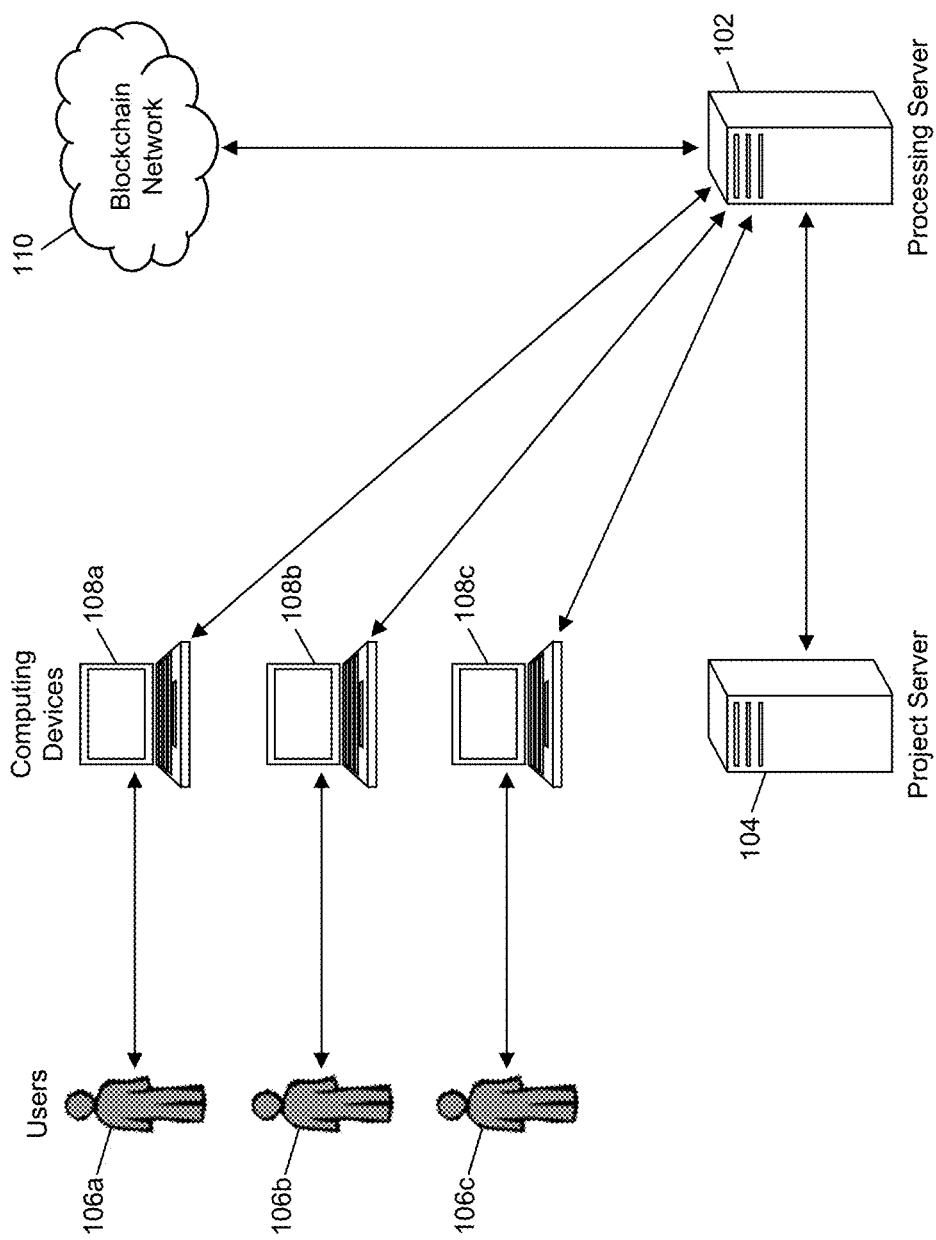
FIG. 1 is a block diagram illustrating a high level system architecture for project management using a blockchain in accordance with exemplary embodiments.

FIG. 1 illustrates a system 100 for the implementation of a designed project management organization and enforcement of roles and contributions thereof via the use of a blockchain.

The system 100 may include a processing server 102. The processing server 102, discussed in more detail below, may be configured to implement a designed project management plan via the use of digital tokens and a blockchain. In the system 100, a project management plan may be designed or otherwise identified by a project server 104. The project server 104 may be a computing system configured to run or utilize a project management tool, which may be used by a user thereof to create a project management plan for a project. A project management plan may include one or more project streams. A project stream may be an aspect of a project that includes at least a plurality of role assignments and an ordering for the plurality of role assignments. Each role assignment may specify a user 106 that is to complete an aspect of the project stream. The ordering of the role assignments may be an order that the users 106 must follow in completion of their aspect of the project stream. For instance, three users 106, illustrated in FIG. 1 as users 106a, 106b, and 106c may each be assigned a role in the project stream, with the ordering such that user 106a must first finish their contribution, then user 106b may perform their contribution, and then users 106c may perform their contribution. In some cases, multiple project streams may be a part of a larger project stream. For example, users 106a and 106b may each perform aspects of separate project streams, where a greater project stream may have 106c contributing only once the project streams of users 106a and 106b are both completed.

The project server 104 may, once the project stream has been created, provide the project stream to the processing server 102 using a suitable communication network and method. In some embodiments, the project server 104 may be a part of the processing server 102. Once the processing server 102 receives the project stream, a digital token may be created for at least the first user 106 in the project stream. The digital token may be a value that is unique to all digital tokens to be used in a given project. The digital token may be, for instance, a numeric value, an alpha numeric value, etc. and may be of sufficient length such that all digital tokens may remain unique. In some cases, the digital token may be of sufficient size and complexity that it is resistant to collision in any project that may ever be implemented by the processing server 102.

The digital token may then be distributed to the first user 106 in the project stream by the processing server 102. The digital token may be electronically transmitted to the user 106 via a computing device 108 associated therewith. The computing device 108 may be any type of device configured to perform the functions discussed herein, such as a specially configured desktop computer, laptop computer, notebook computer, tablet computer, cellular phone, smart phone, smart watch, smart television, etc. The digital token may be electronically transmitted using any suitable communication network and method. In some cases, the digital token may be transmitted to the user 106 via a method retrievable using any computing device 108. For instance, the digital token or information regarding the retrieval thereof may be provided to the user 106 via e-mail or a short messaging service message, where the user 106 may then use any computing device 108 to retrieve the digital token. In some embodiments, the project server 104 may provide additional data with each role assignment, such as instructions regarding that portion of the project stream. In such embodiments, the instructions may be provided to the user 106 along with the corresponding digital token. For example, the user 106 may receive the digital token along with information regarding what aspect of the project they are to contribute when it is their turn to perform.

Each user 106 in the system 100 may be provided with (e.g., or create, as applicable) a private key of a cryptographic key pair. The private key of the cryptographic key pair may be used to generate digital signatures that serve as authentication of the user 106, where the digital signature can be verified by the processing server 102 using a corresponding public key of the cryptographic key pair. In some embodiments, the processing server 102 or project server 104 may be configured to generate private keys for users 106, such as during creation of a project stream. In such embodiments, the private keys may be distributed to users 106 during initialization of the project. In other embodiments, the private key may be generated by and stored on a computing device 108 of each user 106.

The system 100 may also include a blockchain network 110 that is used in the creation and management of a blockchain. The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some cases the processing server 102 may be a node in the blockchain network 110. In other cases, the processing server 102 may be in communication with one or more nodes in the blockchain network 110. In some embodiments, the blockchain network 110 may be a private blockchain network (e.g., where nodes may only be authorized systems). In some such embodiments, the blockchain network may consist of only a single node, such as the processing server 102 that is configured to perform all of the functions of the blockchain network 110, but where the blockchain may be independently verifiable to ensure accuracy and authenticity thereof.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to an entry related to management of the project. For instance, a blockchain data value may be created and added to the blockchain for each contribution to a project stream, where the blockchain data value may include at least the contribution of a user 106. In some cases, a digital signature, as discussed below, may also be included in the blockchain data value. In some instances, the digital token corresponding to that contribution may be included in the blockchain data value. In some embodiments, the initial project stream data (e.g., role assignments and ordering thereof) may be stored in one or more blockchain data values. In some cases, the blockchain may be used to store and manage multiple projects. In such cases, each project may have a unique value associated therewith for identification (herein referred to as a "project identifier"). In these cases, a blockchain data value may include the project identifier for the respective project.

When a user 106 has completed their portion of a project stream, the user 106 may instruct their computing device 108 to submit their portion of the project to the processing server 102. The computing device 108 may generate a digital signature using the private key stored therein or otherwise assigned thereto. The computing device 108 may then electronically transmit at least the digital signature, project contribution, and the digital token assigned to that role assignment to the processing server 102 using a suitable communication network and method. In cases where a project identifier is used, the computing device 108 may also provide the project identifier. The project contribution may be a data file, series of data files, or other data that may be in any suitable format, size, or type as needed for the particular project and/or project stream.

The processing server 102 may receive the data from the computing device 108. The processing server 102 may validate the digital token received from the computing device 108 to ensure that it matches the digital token assigned to the role assignment for which a contribution is due, such as to ensure that the project is being contributed to in the proper order. The computing device 108 may also validate the digital signature using the public key corresponding with the private key used to generate the digital signature. Validation thereof may ensure that the user 106 that is contributing the data is the appropriate user 106. In some cases, only the digital token may be used for such validation. If either validation is unsuccessful, the user 106 may be notified, via the computing device 108, accordingly. For instance, if the validation of the digital token fails because it is not the user's turn to contribute, the user 106 may be notified accordingly.

If the validation(s) is/are successful, then the processing server 102 may add the user's contribution to the blockchain. In cases where the processing server 102 is not a node in the blockchain network 110, the processing server 102 may submit the data file comprising the project contribution to a node in the blockchain network 110 for inclusion in a new blockchain data value that is added to a new block in the blockchain, along with any other necessary data, such as a project identifier, the digital token, or an identifier of the project stream to which the contribution corresponds. In embodiments where the processing server 102 is a node, the processing server 102 may generate the new blockchain data value and include it in a new block that is generated, validated, and added to the blockchain.

Following the addition of the contribution to the blockchain, the processing server 102 may identify the next user 106 (e.g., the user 106b) that is to contribute to that project stream (in cases where multiple project streams may be waiting on the first user's contribution, multiple next users 106 may be identified). The processing server 102 may identify a digital token for the next user 106. In some cases, all digital tokens may be generated or otherwise identified in the initialization of a project or initial receipt of a project stream. In other cases, the processing server 102 may not generate or identify the digital token for a role assignment until it is that role assignment's turn to contribute. The processing server 102 may then transmit the digital token for the next role assignment (e.g., and any information associated therewith) to the next user 106 for retrieval using their computing device 108. The process may then repeat itself for the next user 106, and then for any subsequent users until the project is completed. Once the project is completed, the blockchain may include all of the project contributions in the proper order and with timestamps to verify when each contribution was received and the order in which it was received.

The methods and systems discussed herein may provide for more efficient and successful implementation of a project management plan. The use of a blockchain may provide and immutable and auditable record of the contributions to a project and the ordering in which they were received. The use of digital tokens for role assignments may ensure that only users 106 that are authorized to contribute at a particular time may be able to actually contribute, to prevent users 106 from contributing in an incorrect order, thereby increasing efficiency. In some cases, digital signatures are used to ensure that the correct user 106 that is to perform a step of a project stream is actually the user 106 that is contributing that portion of the project. In some embodiments, the project stream data may also be stored in the blockchain to provide a clear and immutable record of how the project management plan is to be implemented, to further increase the security and auditability of the project management plan. Thus, the system 100 provides for greater implementation of a project management plan than in traditional systems.

Processing Server

Figure 2:
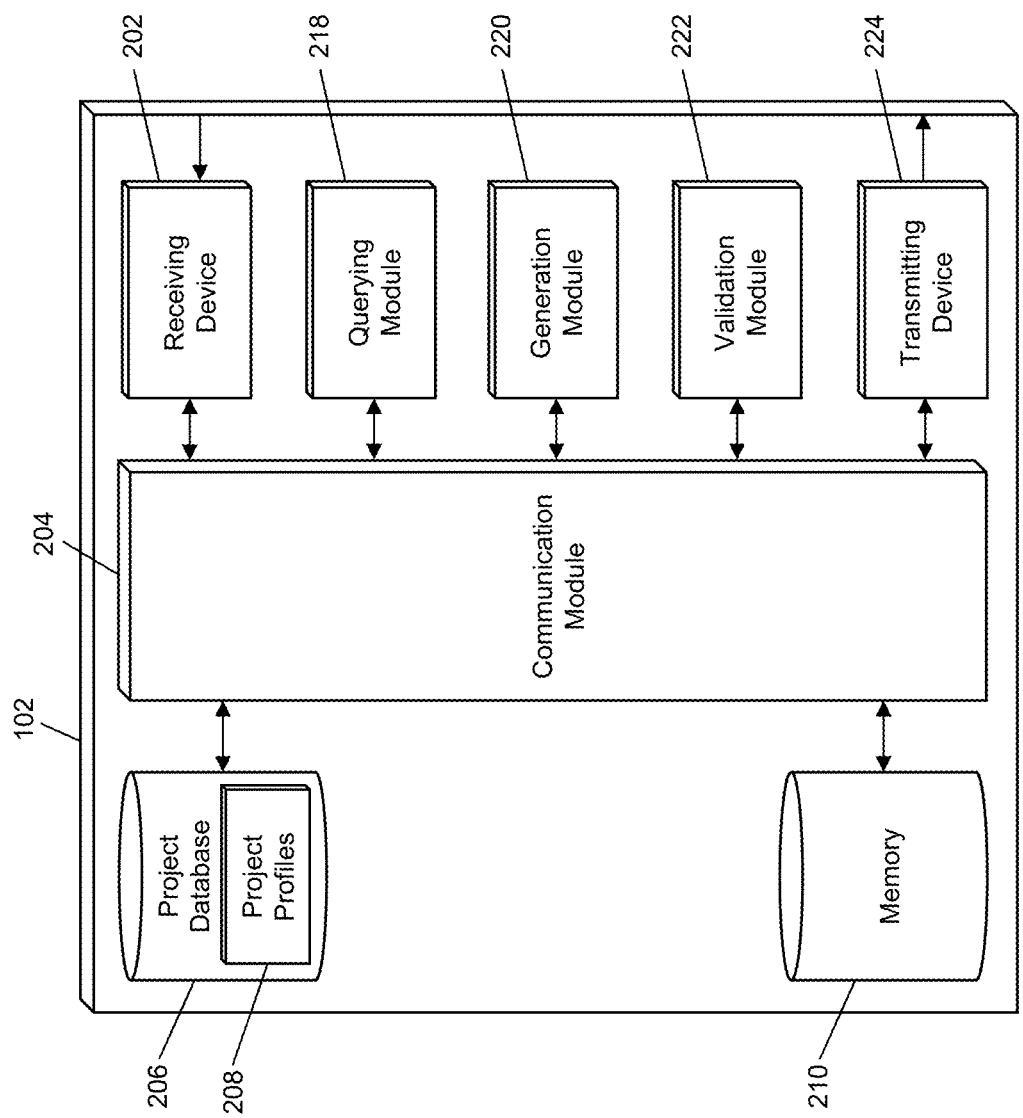
FIG. 2 is a block diagram illustrating the processing server of the system of FIG. 1 for the implementation of project management using a blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from project servers 104, computing devices 108, blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by project servers 104 that may be superimposed or otherwise encoded with project stream data, which may include role assignments, an ordering of role assignments, and any accompanying info for one or more project streams. In some cases, project stream data may also include digital tokens for role assignments and/or private keys or public keys for users 106 associated with role assignments. The receiving device 202 may also be configured to receive data signals electronically transmitted by computing devices 108, which may be superimposed or otherwise encoded with project contributions, which may include one or more data files for the contribution, a digital token, and a digital signature. The receiving device 202 may also be configured to receive data signals electronically transmitted by nodes in a blockchain network 110 that may be superimposed or otherwise encoded with new blocks for validation, blocks for addition to a blockchain, new blockchain data values for inclusion in a block, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a project database 206. The project database 206 may be configured to store a plurality of project profiles 208 using a suitable data storage format and schema. The project database 206 may be a relational database that utilizes structured query language for the storage, identification, modifying, updating, accessing, etc. of structured data sets stored therein. Each project profile 208 may be a structured data set configured to store data related to a project and/or a project stream. For instance, in former cases a project profile 208 may store data for a plurality of project streams comprising a project; in latter cases, a separate project profile 208 may be used to store each project stream, where each project profile 208 may include the project identifier for the project. A project profile 208 may include at least the project identifier (if applicable), the role assignments for a project stream, the ordering of the role assignments, the digital tokens for each role (if identified prior to distribution), and any accompanying information. In some cases, a project profile 208 may also include public keys for each user 106 that is contributing to the project.

The processing server 102 may include a querying module 218. The querying module 218 may be configured to execute queries on databases to identify information. The querying module 218 may receive one or more data values or query strings, and may execute a query string based thereon on an indicated database, such as the project database 206, to identify information stored therein. The querying module 218 may then output the identified information to an appropriate engine or module of the processing server 102 as necessary. The querying module 218 may, for example, execute a query on the project database 206 to insert a new project profile 208 therein for a new project that is to be managed using the blockchain. In another example, the querying module 218 may execute a query on the project database 206 to identify a project profile 208 for a project for which a contribution was received, to identify a digital token therein to validate the received contribution to ensure it was made in the proper order and by the correct user 106.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate digital tokens, cryptographic key pairs, data messages, blockchain data values, block headers, blocks, and other data discussed herein.

The processing server 102 may also include a validation module 222. The validation module 222 may be configured to perform validations for the processing server 102 for use in performing the functions discussed herein. The validation module 222 may receive instructions to validate data as input, may attempt to validate the data as instructed, and may output a result of the validation to another module or engine of the processing server 102. In some cases, the data to be validated may be included in the input. In other cases, the validation module 222 may identify the data. The validation module 222 may be configured to, for example, validate digital tokens received from computing devices 108 using stored (e.g., in the project profiles 208) digital tokens, and to validate digital signatures using public keys.

The processing server 102 may also include a transmitting device 224. The transmitting device 224 may be configured to transmit data over one or more networks via one or more network protocols. In some instances, the transmitting device 224 may be configured to transmit data to project servers 104, computing devices 108, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to project servers 104 that are superimposed or otherwise encoded with project data, such as the contributions to a project, new blocks or a completed blockchain, etc. The transmitting device 224 may also be configured to electronically transmit data signals to computing devices 108, which may be superimposed or otherwise encoded with digital tokens and role assignment information, and/or may include private keys or other data, as applicable. In some cases, the project server 104 may be used to communicate with computing devices 108. In such cases, transmissions discussed herein for transmission to computing devices 108 may be made to the project server 104. The transmitting device 224 may also be configured to electronically transmit data signals to nodes in the blockchain network 110 that may be superimposed or otherwise encoded with project contributions for a project stream, which may be accompanied by project identifiers, project stream identifiers, digital tokens, and/or digital signatures, as applicable.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, blockchain data, hashing algorithms for generating blocks, credentials for validation, usage rule templates, communication data for blockchain nodes, communication data for computing devices 108, public keys associated with users 106 and/or computing devices 108, project stream data, project data, role assignment information, etc.

Process for Project Management Using a Blockchain

Figure 3:
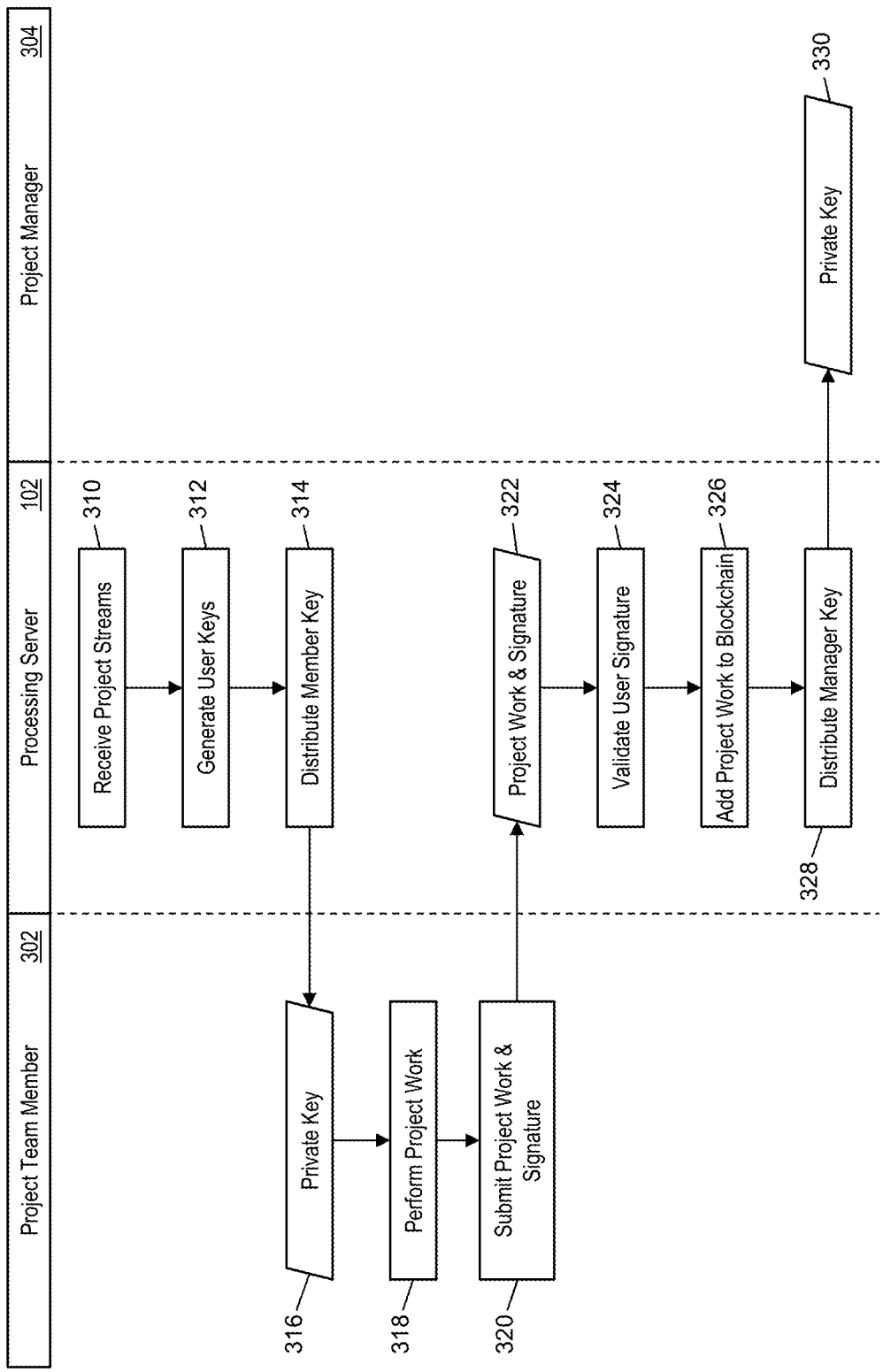
FIG. 3 is a flow diagram illustrating a process for contributing to a project with management thereof using a blockchain in the system of FIG. 1 in accordance with exemplary embodiments.

FIG. 3 illustrates an example process 300 for the implementation of a project management plan in the system 100 via the use of cryptographic key pairs, project streams, and a blockchain. It will be apparent to persons having skill in the relevant art that digital tokens may be used in place of or in addition to the cryptographic key pairs, as discussed above.

In step 310, the receiving device 202 of the processing server 102 may receive one or more project streams from the project server 104 using a suitable communication network and method. Each project stream may include a plurality of role assignments and an ordering of the role assignments, and may, in some cases, also include accompanying information for each of the role assignments. In step 312, the generation module 220 of the processing server 102 may generate a cryptographic key pair for each of the users 106 involved as a project team member 302 in the project streams. In some cases where a single project team member 302 may have multiple role assignments, a single cryptographic key pair may be generated for that project team member. In other cases, a single cryptographic key pair may be generated for each role assignment, even in cases where a single project team member 302 may have multiple role assignments.

In step 314, the transmitting device 224 may electronically transmit the private key for each of the first role assignments to the respective project team members 302 (e.g., via computing devices 108 associated therewith) using a suitable communication network and method. In cases where additional accompanying information was included in the project stream data, such information may be transmitted to the project team member 302 with the respective private key. In step 316, the project team member 302 may (e.g., via a computing device 108) receive the private key for their role assignment, and any additional information.

In step 318, the project team member 302 may perform their work to complete their role assignment. In step 320, the project team member 302 may (e.g., via the computing device 108) submit their project work and a digital signature to the processing server 102 using a suitable communication network and method. The project work may comprise one or more data files. The digital signature may be generated by the computing device 108 of the project team member 302 using the private key received in step 316. In step 322, the receiving device 202 of the processing server 102 may receive the project work and digital signature from the project team member 302. In cases where a project identifier and/or project stream identifier is used, such data may be included in the transmission from the project team member 302 to the processing server 102.

In step 324, the validation module 222 of the processing server 102 may validate the digital signature received from the project team member 302 using the public key of the cryptographic key pair to which the private key that was sent to the project team member 302 corresponds. In step 326, the project work may be added to a new blockchain data entry that is transmitted, by the transmitted device 224 of the processing server 102, to a node in the blockchain network for inclusion in a new block that is added to the blockchain. In step 328, the processing server 102 may identify the private key of the cryptographic key pair generated for a project manager 304 that has the next role assignment in the project stream where work was completed by the project team member 302, which may then be distributed to the project manager 304 by the transmitting device 224 of the processing server 102. In step 330, the project manager 304 may receive the private key and may proceed to perform their work as part of their role assignment for the project stream.

Exemplary Method for Project Management Using a Blockchain

Figure 4:
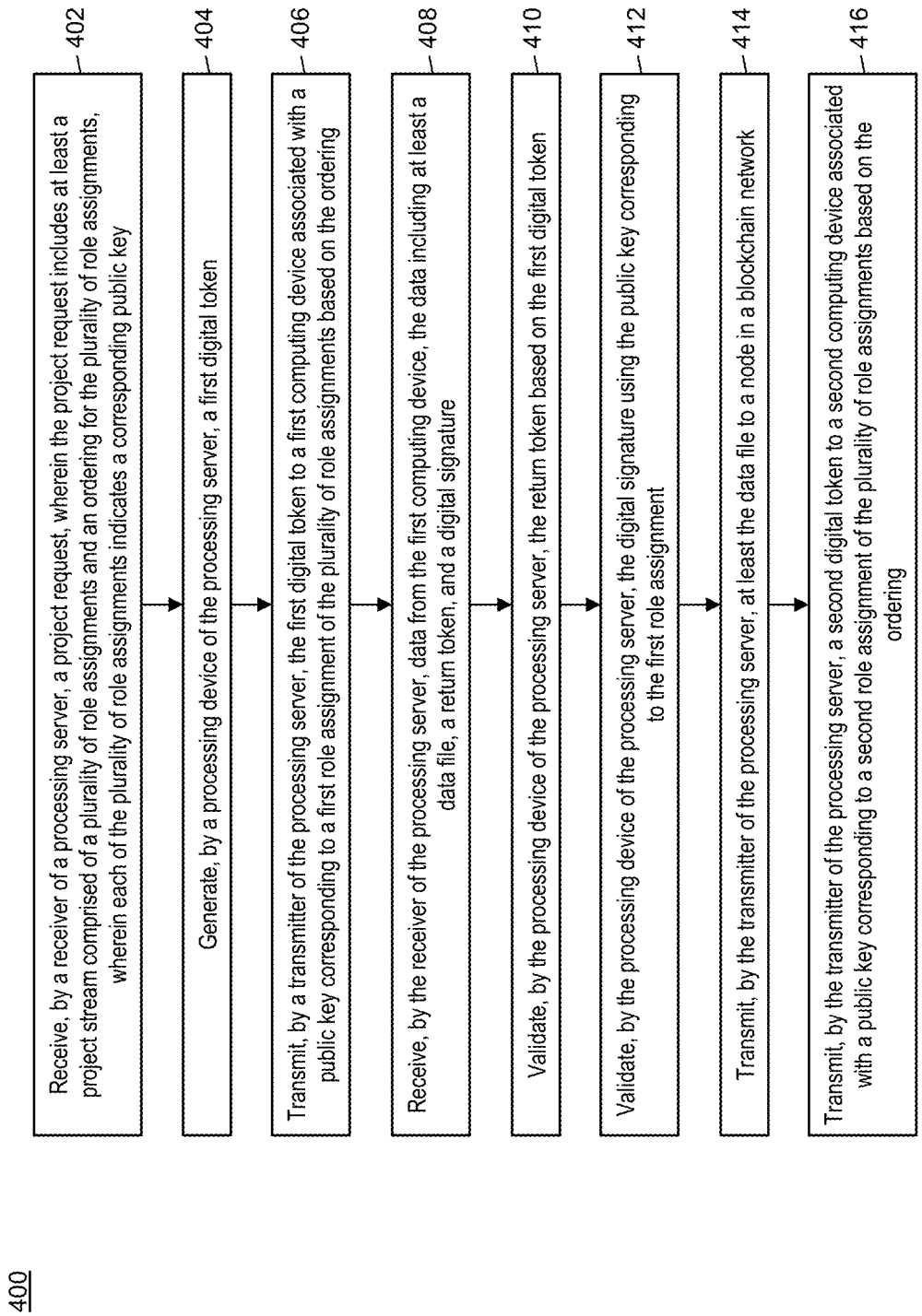
FIG. 4 is a flow chart illustrating an exemplary method for project management using a blockchain in accordance with exemplary embodiments.

FIG. 4 illustrates a method 400 for the implementation of project streams in project management of a project using digital tokens, private keys, and a blockchain.

In step 402, a project request may be received by a receiver (e.g., the receiving device 202) of a processing server (e.g., the processing server 102), wherein the project request includes at least a project stream comprised of a plurality of role assignments and an ordering for the plurality of role assignments, wherein each of the plurality of role assignments indicates a corresponding public key. In step 404, a first digital token may be generated by a processing device (e.g., the generation module 220) of the processing server. In step 406, the first digital token may be transmitted by a transmitter (e.g., the transmitting device 224) of the processing server to a first computing device (e.g., the computing device 108a) associated with a public key corresponding to a first role assignment of the plurality of role assignments based on the ordering. In step 408, data may be received from the first computing device by the receiver of the processing server, the data including at least a data file, a return token, and a digital signature.

In step 410, the return token may be validated by the processing device (e.g., the validation module 222) of the processing server based on the first digital token. In step 412, the digital signature may be validated by the processing device of the processing server using the public key corresponding to the first role assignment. In step 414, at least the data file may be transmitted by the transmitter of the processing server to a node in a blockchain network (e.g., the blockchain network 110). In step 416, a second digital token may be transmitted by the transmitter of the processing server to a second computing device (e.g., the computing device 108b) associated with a public key corresponding to a second role assignment of the plurality of role assignments based on the ordering.

In one embodiment, the method 400 may further include generating, by the processing device of the processing server, the second digital token prior to transmitting the second digital token. In some embodiments, generating the first digital token may include generating the second digital token. In one embodiment, generating the first digital token may include generating a digital token for each role assignment of the plurality of role assignments. In some embodiments, the method 400 may also include transmitting, by the transmitter of the processing server, the project request to a node in the blockchain network.

In one embodiment, the method 400 may also include storing, in an account database (e.g., the memory 210) of the processing server, a plurality of account profiles, wherein each account profile includes at least a public key and a communication address. In a further embodiment, the first digital token may be transmitted to the first computing device using the communication address included in a specific account profile where the included public key is the public key corresponding to the first role assignment. In another further embodiment, the communication address may be one of: a telephone number, e-mail address, media access control address, and internet protocol address.

Computer System Architecture

Figure 5:
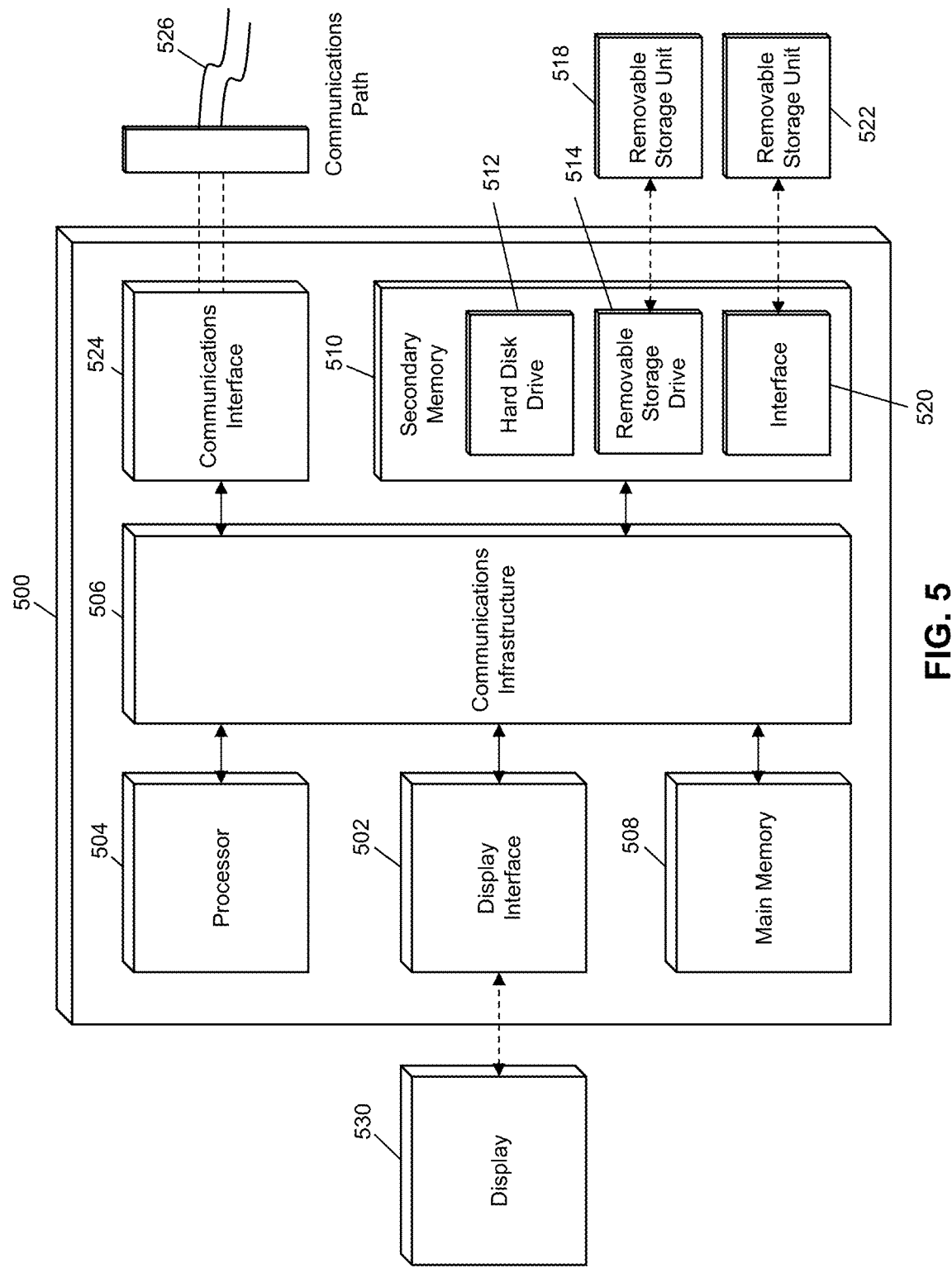
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein.

Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for project management using a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for project management using a blockchain, comprising:
   receiving, by a receiver of a processing server, a project request, wherein the project request includes at least a project stream comprised of a plurality of role assignments and an ordering for the plurality of role assignments, wherein each of the plurality of role assignments indicates a corresponding public key;
   generating, by a processing device of the processing server, a first digital token;
   transmitting, by a transmitter of the processing server, the first digital token to a first computing device associated with a public key corresponding to a first role assignment of the plurality of role assignments based on the ordering;
   receiving, by the receiver of the processing server, data from the first computing device, the data including at least a data file, a return token, and a digital signature;
   validating, by the processing device of the processing server, the return token based on the first digital token;
   validating, by the processing device of the processing server, the digital signature using the public key corresponding to the first role assignment;
   transmitting, by the transmitter of the processing server, at least the data file to a node in a blockchain network; and
   transmitting, by the transmitter of the processing server, a second digital token to a second computing device associated with a public key corresponding to a second role assignment of the plurality of role assignments based on the ordering.

2. The method of claim 1, further comprising:
   generating, by the processing device of the processing server, the second digital token prior to transmitting the second digital token.

3. The method of claim 1, wherein generating the first digital token includes generating the second digital token.

4. The method of claim 1, wherein generating the first digital token includes generating a digital token for each role assignment of the plurality of role assignments.

5. The method of claim 1, further comprising:
   storing, in an account database of the processing server, a plurality of account profiles, wherein each account profile includes at least a public key and a communication address.

6. The method of claim 5, wherein the first digital token is transmitted to the first computing device using the communication address included in a specific account profile where the included public key is the public key corresponding to the first role assignment.

7. The method of claim 5, wherein the communication address is one of: a telephone number, e-mail address, media access control address, and internet protocol address.

8. The method of claim 1, further comprising:
   transmitting, by the transmitter of the processing server, the project request to a node in the blockchain network.

9. A system for project management using a blockchain, comprising:
   a receiver of a processing server configured to receive a project request, wherein the project request includes at least a project stream comprised of a plurality of role assignments and an ordering for the plurality of role assignments, wherein each of the plurality of role assignments indicates a corresponding public key;
   a processing device of the processing server configured to generate a first digital token; and
   a transmitter of the processing server configured to transmit the first digital token to a first computing device associated with a public key corresponding to a first role assignment of the plurality of role assignments based on the ordering, wherein
   the receiver of the processing server is further configured to receive data from the first computing device, the data including at least a data file, a return token, and a digital signature,
   the processing device of the processing server is further configured to
      validate the return token based on the first digital token, and
      validate the digital signature using the public key corresponding to the first role assignment, and
   the transmitter of the processing server is further configured to
      transmit at least the data file to a node in a blockchain network, and
      transmit a second digital token to a second computing device associated with a public key corresponding to a second role assignment of the plurality of role assignments based on the ordering.

10. The system of claim 9, wherein the processing device of the processing server is further configured to generate the second digital token prior to transmitting the second digital token.

11. The system of claim 9, wherein generating the first digital token includes generating the second digital token.

12. The system of claim 9, wherein generating the first digital token includes generating a digital token for each role assignment of the plurality of role assignments.

13. The system of claim 9, further comprising:
an account database of the processing server configured to store a plurality of account profiles, wherein each account profile includes at least a public key and a communication address.

14. The system of claim 13, wherein the first digital token is transmitted to the first computing device using the communication address included in a specific account profile where the included public key is the public key corresponding to the first role assignment.

15. The system of claim 13, wherein the communication address is one of: a telephone number, e-mail address, media access control address, and internet protocol address.

16. The system of claim 9, wherein the transmitter of the processing server is further configured to transmit the project request to a node in the blockchain network.

\* \* \* \* \*